Feb. 23, 1960 A. FEYZEAU 2,926,242

SYNCHRONIZATION SIGNAL GENERATOR

Filed Sept. 15, 1954 6 Sheets-Sheet 1

INVENTOR
ALBERT FEYZEAU

BY Strauch, Nolan & Diggins
ATTORNEYS

Feb. 23, 1960 A. FEYZEAU 2,926,242

SYNCHRONIZATION SIGNAL GENERATOR

Filed Sept. 15, 1954 6 Sheets-Sheet 2

INVENTOR
ALBERT FEYZEAU

BY Strauch, Nolan & Diggins
ATTORNEYS

INVENTOR
ALBERT FEYZEAU

BY Strauch, Nolan & Diggins
ATTORNEYS

Feb. 23, 1960 A. FEYZEAU 2,926,242

SYNCHRONIZATION SIGNAL GENERATOR

Filed Sept. 15, 1954 6 Sheets-Sheet 4

INVENTOR
ALBERT FEYZEAU

BY Strauch, Nolan & Diggins

ATTORNEYS

INVENTOR
ALBERT FEYZEAU

BY Strauch, Nolan & Diggins
ATTORNEYS

Feb. 23, 1960 A. FEYZEAU 2,926,242

SYNCHRONIZATION SIGNAL GENERATOR

Filed Sept. 15, 1954 6 Sheets-Sheet 6

INVENTOR
ALBERT FEYZEAU

BY Strauch, Nolan & Diggins

ATTORNEYS 2,926,242

SYNCHRONIZATION SIGNAL GENERATOR

Albert Feyzeau, St. Maur des Fosses, France, assignor to Ste Nouvelle de l'Outillage R B V et de la Radio-Industrie, Paris, France, a society anonyme of France Application September 15, 1954, Serial No. 456,258

5 Claims. (Cl. 250—27)

This invention relates to production of electrical timing signals and more particularly to apparatus for developing line and field synchronizing and blanking pulses for television apparatus.

In television transmitting systems electron beam scanning devices are used at the transmitter end and at the receiver end of the system for scansion of the image to be televised and for reproduction, respectively. In order to obtain a satisfactory reproduction of the televised image, it is necessary that the horizontal and vertical motion of the electron beam at the receiver be accurately synchronized with the electron beam at the transmitter. Therefore, a synchronizing signal comprising both line synchronizing pulses and field synchronizing pulses is transmitted as part of the composite video signal but at a time when no picture information is transmitted.

In addition to the synchronizing signals, it is also necessary that blanking signals be provided for both the line and field synchronizing signals so that there will be no picture transmitted during the retrace time when the electron beam is moving from right to left between successive lines or from bottom to top between successive fields. The blanking signals and synchronization signals must have a predetermined phase relationship with an extremely low time tolerance.

Ordinarily the synchronization generator which provides the synchronization and blanking pulses is located at the transmitting station. The blanking pulses are transmitted by cable or microwave relay to the transmitter from the camera equipment and the synchonization pulses are added to the television picture signal when the signal is sent to the station before being monitored or transmitted. It is therefore apparent that a variation in the phase relationship between the blanking pulses and the synchronization pulses proportional to the distance between the station and the camera is introduced in portable camera installations. This signal generator includes a circuit arrangement which permits the operator to vary the phase relationship between the starting of the blanking signals and the start of the synchronization signals.

In prior design of synchronization generators, as indicated by United States Patent Nos. 2,515,613 to Schoenfeld, 2,664,887 to Wolfe, and 2,660,615 to Ellis et al., a master oscillator feeding a series of frequency dividing stages has been used to obtain signals at the proper frequency for synchronizing control signal generators. The use of several generators coupled to be synchronized has also been proposed. The operation of these circuits is subject to a time drift because of the ageing of the vacuum tubes. Furthermore the use of a large number of vacuum tubes requires a large power supply source which in itself must be well regulated due to the stability conditions required from the synchronization generator.

According to this invention only passive networks are used to provide the exact timing required by the synchronization circuits, and electron tube circuits only of the binary or "yes" or "no" type are used in which the ageing of the active elements and the regulation of the power supply does not affect the precision of the circuit. Furthermore many of the vacuum tubes required for gating circuits in prior television synchronization signal generators may be replaced by semi-conducting elements thereby permitting use of a much smaller power supply.

It is accordingly an object of this invention to use an extremely stable counter having binary stages arranged in a counting circuit arrangement to provide gating signals in response to predetermined conditions in the various stages of the counting circuit arrangement.

It is a further object of this invention to use an "and" gating circuit in combination with a binary frequency divider to provide a simplified circuit arrangement for developing reliable gating signals.

It is a still further object of this invention to provide the exact time of occurrence of the leading and trailing edges of the various television control signals by gating the output from adjustable taps on a passive delay line.

It is another object of this invention to provide simplified circuitry for developing synchronizing and blanking signals for a television signal.

These and other objects of this invention will become more fully apparent from the following detailed description when considered in connection with the appended claims and the accompanying drawings wherein:

Figure 1:
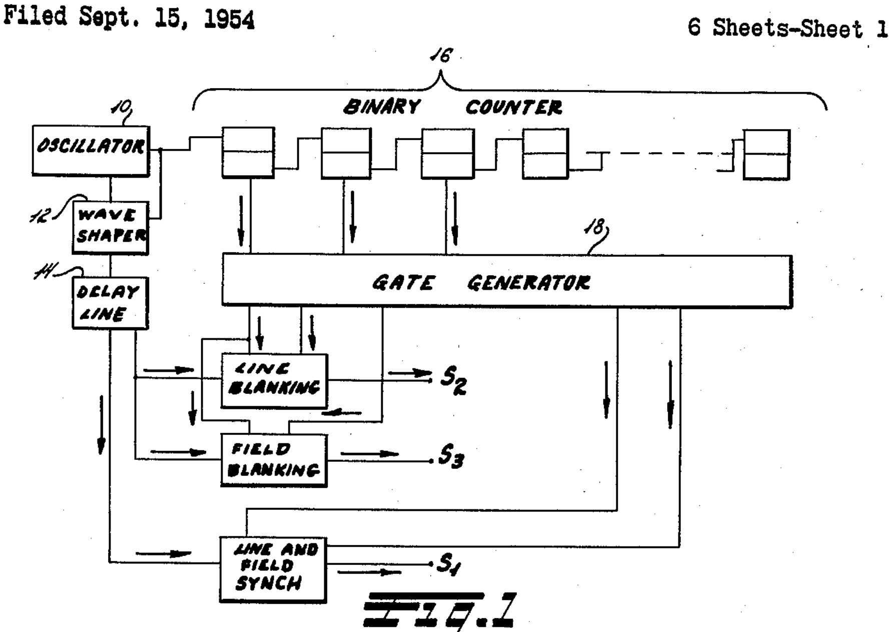
Figure 1 shows diagrammatically in block form the general arrangement of the circuits constituting a control signal generator according to this invention.
Figure 9:
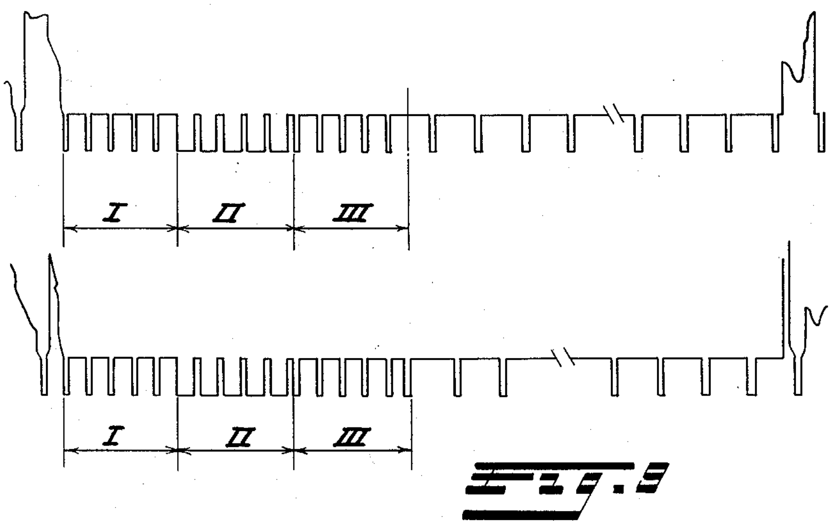
Figure 11:
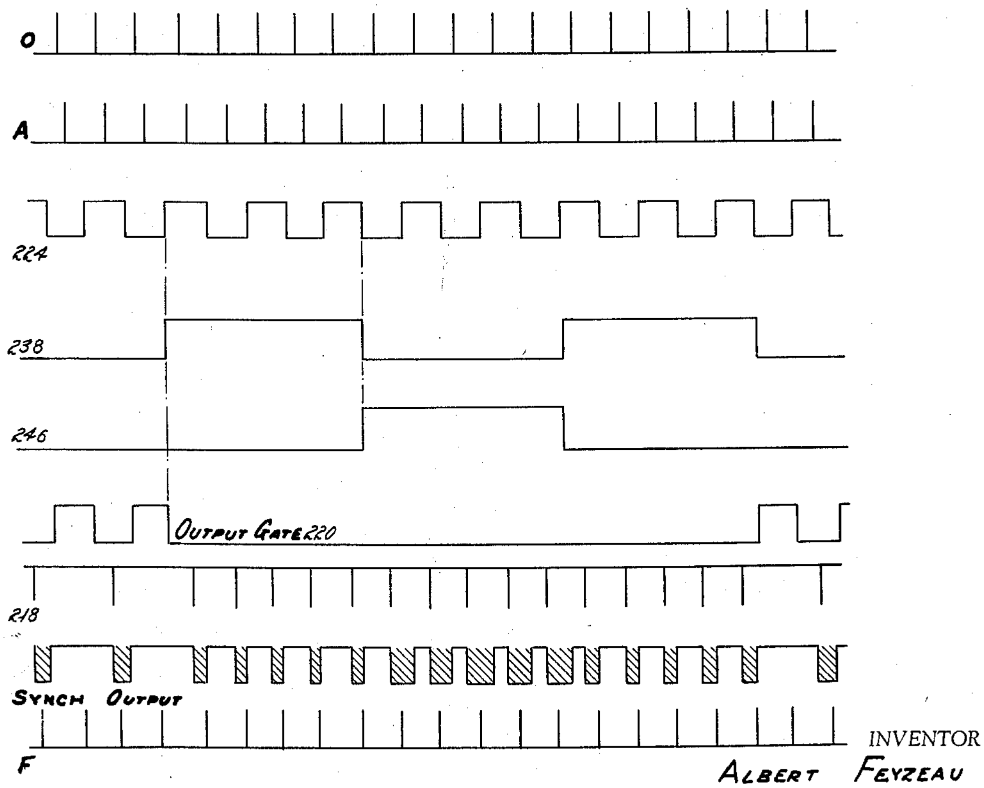
Figure 10:
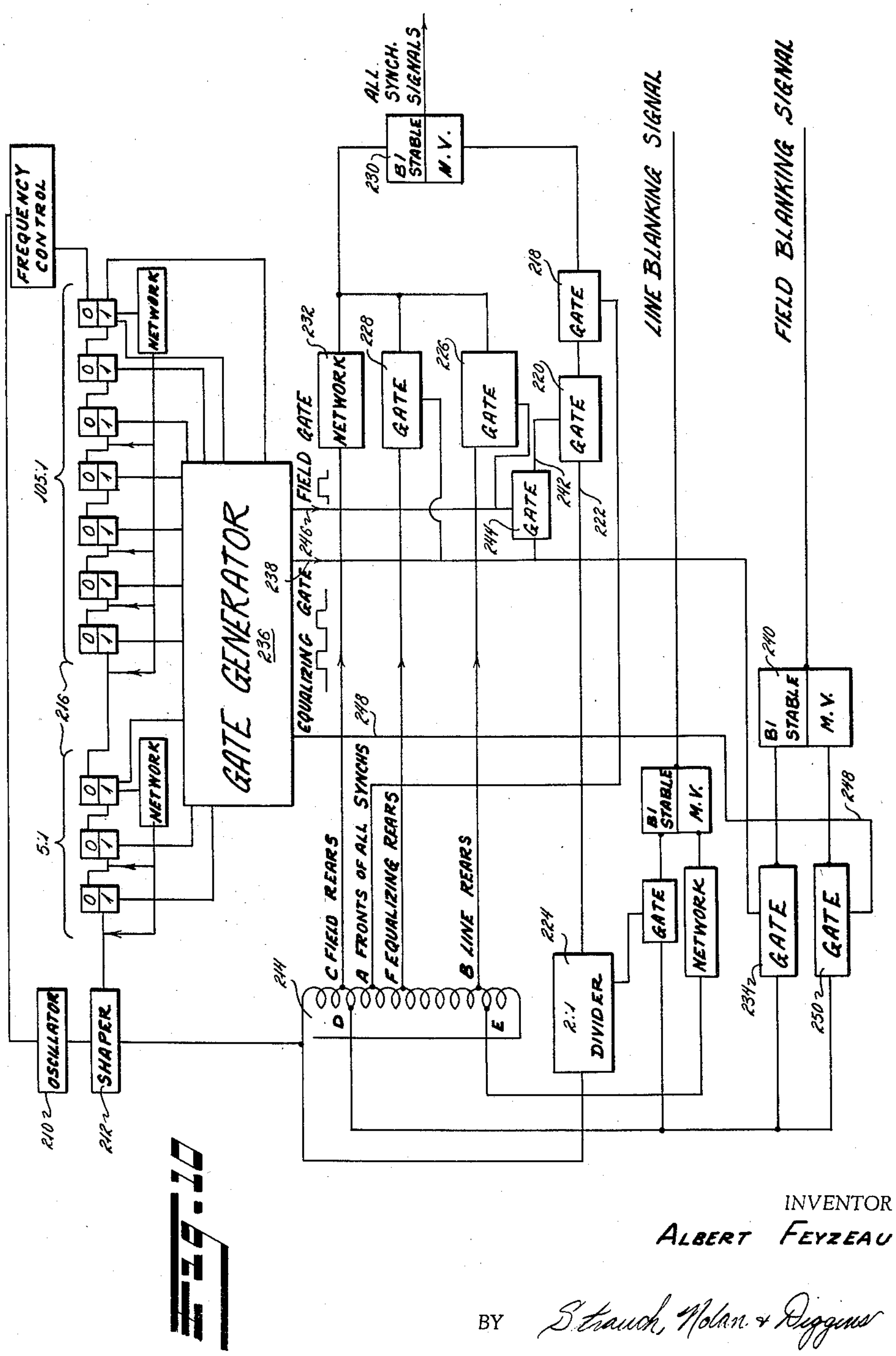

Figure 9 shows the system diagram of a synchronization generator adapted to provide the conventional broadcast television synchronization signals as used in Europe; and Figure 10 shows the system diagram of another synchronization generator illustrating this invention, and Figure 11 illustrates curves helping the understanding of the operation of the generator Referring now to Figure 1 the block diagram shows the basic features of the system according to this invention. The master oscillator 10 generates the pulses which are fed through a wave shaper 12 to a delay line 14 and are selectively tapped from the delay line to provide the timing edges of both the synchronization and the blanking pulses. The duration of each of these signals is roughly determined by means of a binary counter 16 also fed with pulses delivered by the master oscillator. The output from binary counter 16 feeds gate generator 18. The output of gate generator 18 is used to selectively pass the desired pulses into the outputs S–1, S–2, and S–3 which provide the line and field synchronization pulses, the line blanking pulse and the field blanking pulse respectively.

The exact time of occurrence of the front and rear edges of each pulse is determined by the output from delay line 14 and is independent of any variations in the power supply or of variations that may occur due to aging of the counting tubes. The edges of the blanking pulses are obtained from variable taps on the delay line which can be adjusted by a monitor at the station to provide the proper spacing between the beginning of the blanking pulses and the beginning of the corresponding synchronization pulse.

The description of Figures 1–8 is of an embodiment of the invention which delivers all the timing signals required for a television system according to the French high definition standard, i.e. 819 lines per complete frame, 25 frames per second, each frame comprising two interlaced fields. This system uses the positive polarity of transmission rather than the negative polarity of transmission commonly used in the United States and therefore the dark parts of the picture are represented by low amplitudes in the transmitted picture signal and the synchronizing signals are represented by even lower amplitude signals.

Figure 2:
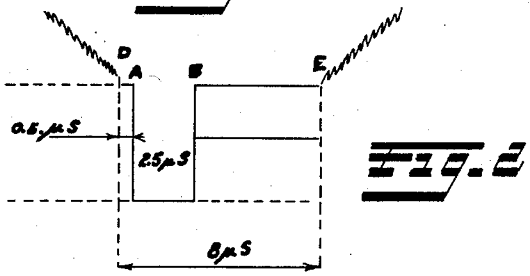
Figure 2 shows the details of the line blanking and synchronization signal as used in the French high definition television system.

The curve of Figure 2 represents the synchronization and blanking signals which have to be superimposed or added to the video signal at the end of each scanning line. The line control signal essentially comprises a comparatively long pulse D—E (8 $\mu$s.) called the line blanking pulse during which time the scanning beam of the camera or pick-up tube and of the picture tube are switched off, and a signal of shorter duration A—B (2.5 microseconds) which is the line synchronization pulse. It is essential for proper reception of the television signal that the relative phases of the pulses D—E and A—B be such that the leading edge of pulse A—B occurs .5 microsecond after the leading edge of pulse D—E. Since the blanking pulse D—E is sent from the station to the camera and then returns to the station as part of the video signal before the synchronization pulse A—B is added to the video signal, variable delay is encountered by blanking pulse D—E as this pulse travels to and from the camera in the transmission cables or microwave relay. This embodiment of the invention includes an adjustment so that the blanking pulse may be given a head start to compensate for this delay by adjusting taps on the delay line.

Figure 3:
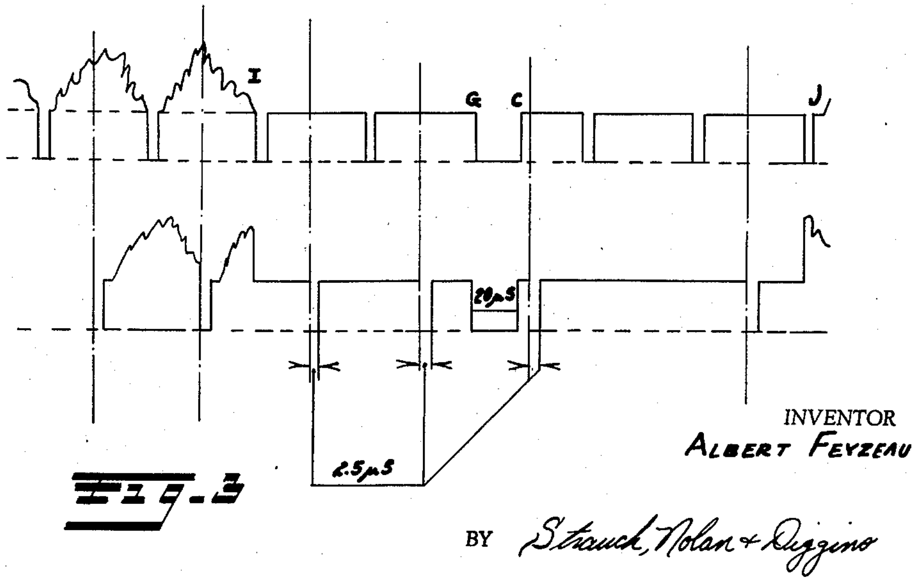
Figure 3 shows the field blanking pulse with both the field and line synchronization signals.

A composite video signal as used by this television system is shown in Figure 3 and consists of the synchronizing and blanking signals which are added to the video signal at the end of each field as well as the line control signals. The field control signals include long pulse I—J, periodically recurring at the rate of fifty per second and carry line scanning synchronization signals. This pulse is the field blanking pulse while the relatively short pulse G—C is the field synchronizing pulse. The duration of the field blanking signal I—J corresponds to 41 scanning lines and as illustrated in the figure the line synchronization pulse signals are maintained during the field blanking pulse. Since 819 lines are used with an interlaced scanning order to two, the recurrence frequency of the field synchronization pulses is an odd subharmonic of twice that of the line synchronization pulses which explains the ½ line phase shift of the field control signals between the two successive field blanking periods as shown in Figure 3. The control signals in each half of this figure repeat themselves at the frame frequency of 25 per second. To obtain these two types of field signals, it is necessary that master oscillator 10 should deliver pulses at twice the line frequency.

The phase of both synchronization signals is invariable with respect to that of the master oscillations from oscillator 10. Since the field blanking signal is synchronized to start and stop with the start of a double frequency line blanking signal, the phase of the blanking signal both in line and field is adjustable with respect to the master oscillations of oscillator 10 and may be calibrated as a function of the length of transmission line used between the camera and the telecasting station.

Figure 4:
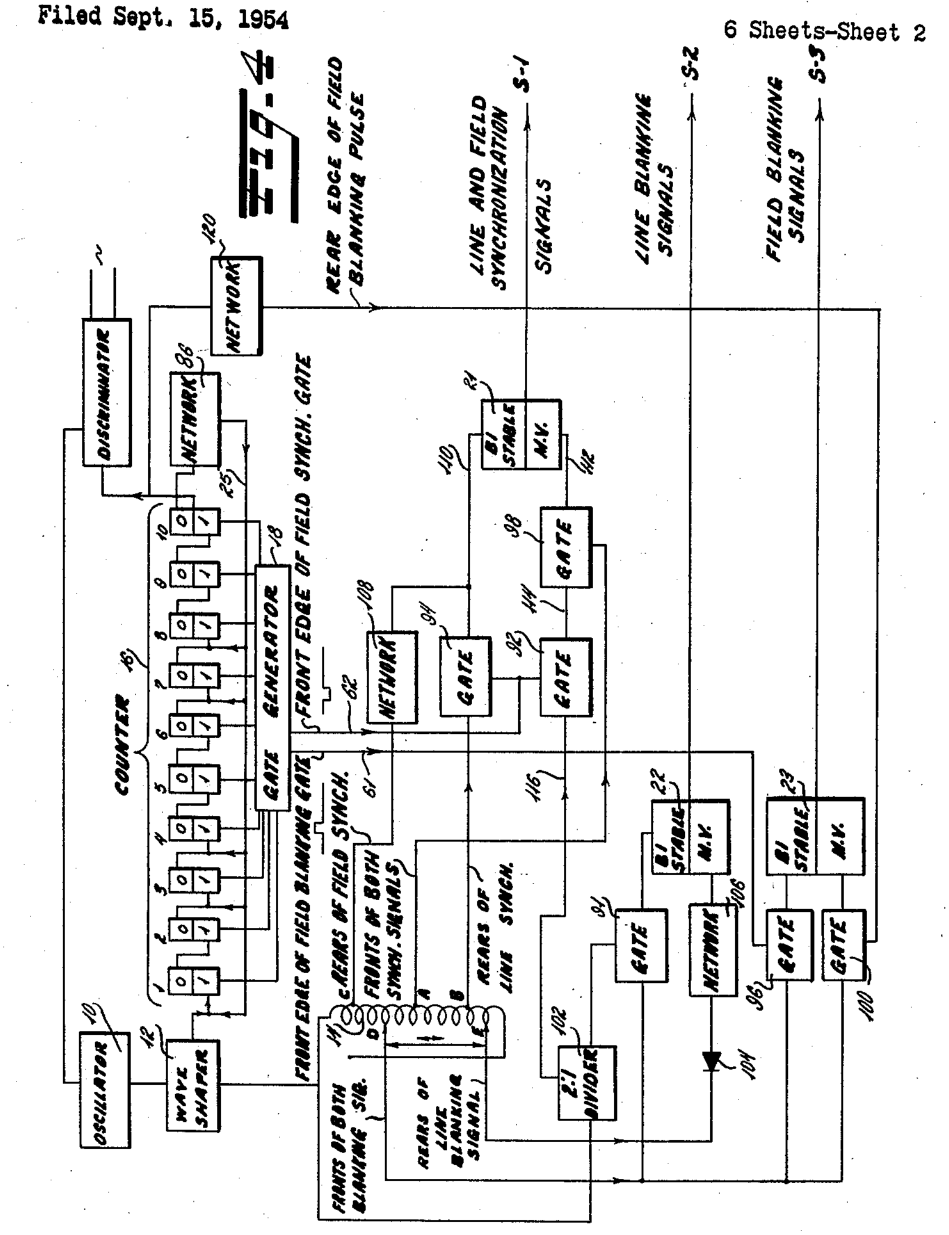
Figure 4 shows the system diagram of a synchronization generator illustrating this invention.

Referring now to Figure 4, the entire block diagram is shown for a synchronization signal generator in accordance with the principles of this invention. The frequency of the master oscillator 10 is equal to twice the product of the number of lines per frame times the number of frames per second (i.e. 40,950 cs.). The output from master oscillator 10 is fed to a wave shaping and coupling network 12 which may include a limiting stage. The output from wave shaper 12 is fed to both a counter 16 which includes ten binary dividing stages, the counting capacity is changed from $2^{10}=1024$ to 819 by presetting, and a delay line 14, the remote end of which is a short circuit. Taps are provided along the delay line for picking off properly delayed pulses which accurately determine the front and rear edges of the various synchronization and blanking pulses. Signals which have approximately the proper occurrence time are developed in gate generator 18 in response to predetermined counts from counter 16. Gate generator 18 delivers the gating signals which are fed to the various gated channels to permit the proper signal from delay line 14 to be delivered to bistable circuit elements 21, 22 and 23 to provide the control signals appearing at S–1, S–2 and S–3.

The leading edges of both the line and field synchronization signals are obtained from tap A on delay line. The rear edge of the line synch pulse is obtained from tap B and the rear edge of the field synch. pulse is obtained from tap C. The leading edges of both the line and field blanking pulses and the rear edge of the field blanking pulse are obtained from adjustable tap D and the rear edge of the line blanking pulse is obtained from tap E which moves with tap D. This is possible since the field blanking pulse has a duration equal to an integral number of line duration.

Since some of the pulse edges occur at the field repetition rate which is 50 times per second while others occur at the line repetition rate which is 819×25 per second and the field pulses are to be phase displaced with respect to line pulses, an elaborate counting and gating arrangement is required. Therefore the frequency of the master oscillator and the operation of the counting circuit are chosen so that a total over-all division by 819 is obtained 50 times per second. As is quite apparent, division by 819 cannot be obtained by the use of binary counting stages without predetermination or adjustment of some of the binary stages, since binary stages only operate a division by a power of two.

To study the operation of the counter, it is convenient to transcribe the numbers to their binary equivalents. Ten binary stages allow a division by $2^{10}$, or 1,024. In such a system 1,024 is written 10,000,000,000. Number 819 is written 01,100,110,011, and the difference between them of 205 is written 00,011,001,101. By injecting the output of the last stage of counter 16 to the inputs of stages 1, 3, 4, 7 and 8 through line 25 of the counter, which stages are determined by the location of the ones in the binarily indicated difference of 205, these stages necessarily pass from stage 0 to stage 1 each time the last stage in the counter triggers from 0 to 1 effectively causing the counter to count 819 pulses for each cycle instead of counting 1024.

For example, if the master oscillator has a frequency of 50 times 819 or 40,950 cycles and the output of the frequency divider stage is 50 cycles per second, then the input to stage 1 of the counter will have 40,950 plus 50 or 41,000 pulses per second. Since each stage divides by two, the output from stage 1 will be 20,500 and the output from stage 2 will be 10,250. Since the input to stage 3 includes 50 extra cycles each second, the total will be 10,300 and its output will be 5,150. The input to stage 4 also includes 50 extra pulses making it 5,200 and the output is 2,600. The output from stage 5 is 1,300 and the output from stage 6 is 650. The input to stage 7 includes 50 extra pulses making it 700 and the output from stage 7 is 350. The input to stage 8 also includes 50 extra pulses making it 400 and its output is 200, the output from stage 9 is 100 and the output from stage 10 is 50. It is therefore seen that the binary frequency divider is connected in such a manner as to give a predetermined division of 819.

Figure 5:
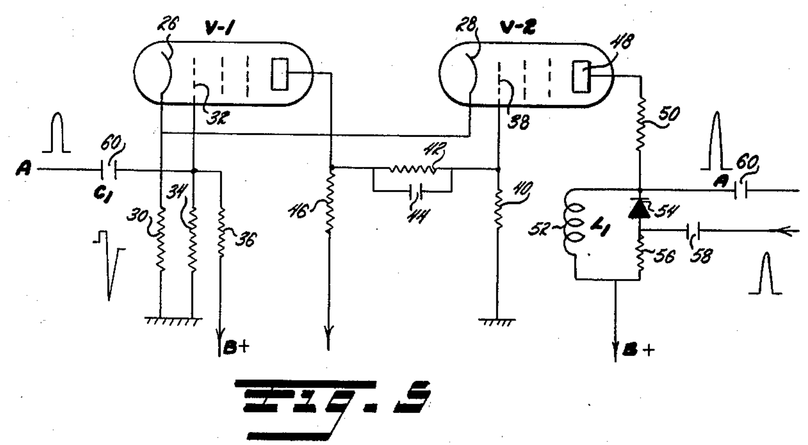
Figure 5 illustrates one embodiment of a single binary frequency dividing stage.
Figure 7:
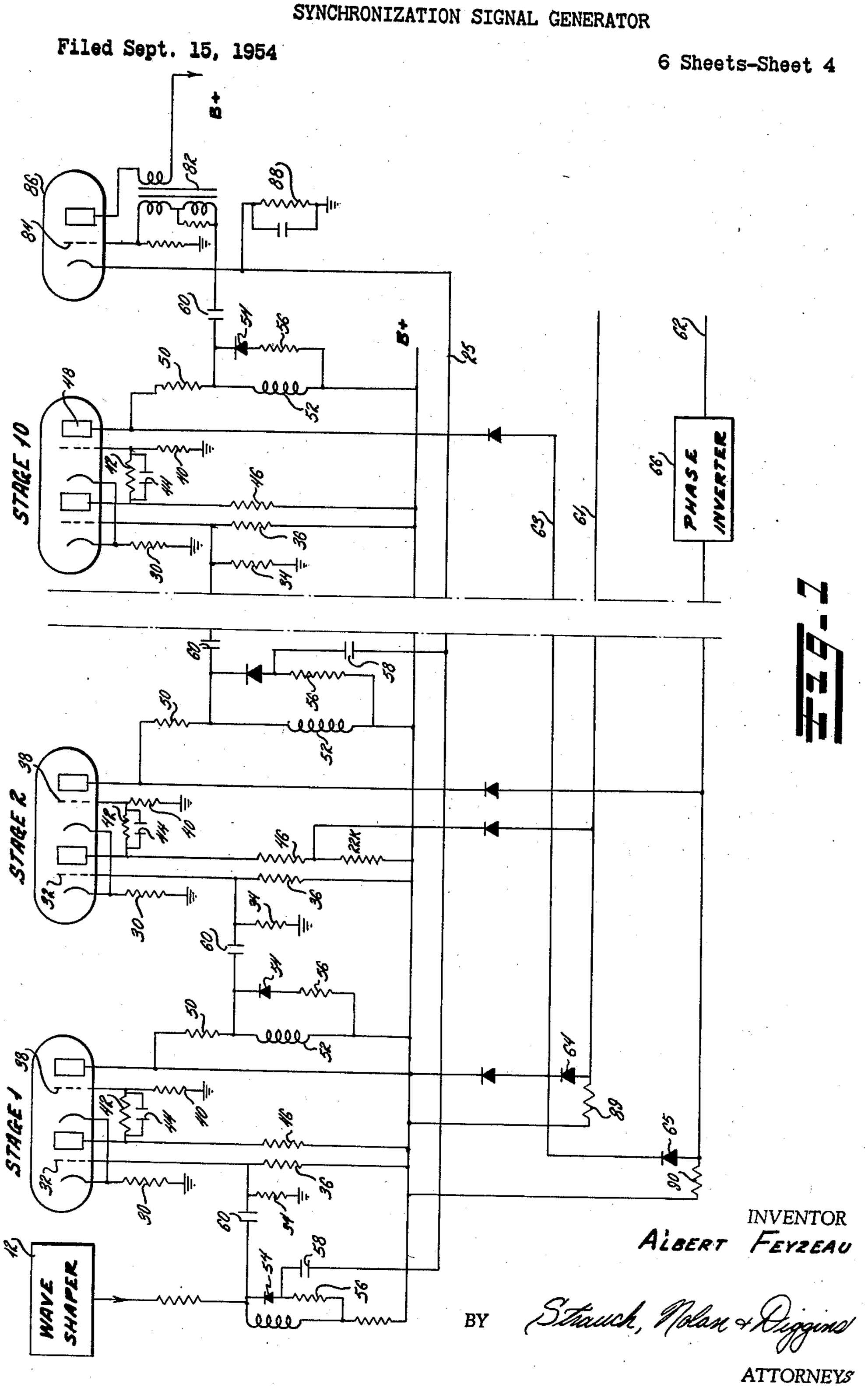
Figure 7 is a detailed circuit diagram of representative portions of the counter and gate generator which provides the field blanking and synchronization pulses.

In Figures 5 and 7 the details of a trigger circuit which can be used in the various stages in the counter 16 are shown. Each stage comprises a set of two tubes V–1, V–2 which may be a double tube in a single envelop and can be a pentode as shown in Figure 5 or a triode as shown in Figure 7.

The two cathodes 26 and 28 are coupled together by means of a common resistor 30. The grid 32 of V–1 is connected to the junction of two resistors 34 and 36 which are connected to ground and B+ respectively. Grid 38 of V–2 is connected to ground through resistor 40 and to B+ through resistor 42, condenser 44 and resistor 46. The plate 48 of tube V–2 is connected to the anode voltage supply or B+ through resistor 50 and a network including inductance 52, rectifier 54 and resistor 56. Stages 1, 3, 4, 7 and 8, as discussed above, each have an additional condensor 58 connected in their input circuits (or the output circuits of the preceding stage) between rectifier 54 and resistor 56 to introduce the predetermination pulses from the output of the counter 16. Condenser 60 is the coupling condenser between the output of one stage and the input to the next succeeding stage.

In operation, assume that V–2 is the zero indicating tube and is initially cut-off. V–1 is conducting. Therefore the resistance between cathode 26 and grid 32 is very small. When the first positive pulse is applied to the condenser 60, the potential of the left hand plate of capacitor 60 is increased during the leading edge of the pulse. The right hand plate potential of capacitor 60 does not change since the positive charges which would appear are carried off as grid current. Therefore the voltage on the grid 32 does not increase. During the decreasing or rear edge of the pulse, negative charges appear on both plates of condenser 60 and the charges appearing on the right hand plate are increased by the grid current. Therefore a deep drop of grid potential is produced which is sufficiently negative to cut-off tube V–1. When V–1 is cut-off the potential of its plate is increased and a positive pulse is applied to grid 38 of V–2 by means of 42—44 network. Tube V–2 is made conducting and its plate potential is decreased. Owing to the low direct resistance of unidirectional device 54, which acts as a short circuit with respect to negative pulses, no pulse is applied to the next stage.

The second positively polarised pulse coupled through condenser 60 and grid 32 of V–1 has the effect of triggering V–1 on and cutting V–2 off due to the negative output from the plate of V–1 coupled to the grid 38 of V–2 through resistor 42, capacitor 44 combination. The plate 48 of V–2 then goes positive with inductance 52 differentiating the positive pulse. Only the positive portion of the differentiated wave form output appears at point A as rectifier 54 acts as a short circuit in relation to the negative going pulse present when tube V–2 is subsequently triggered on. Tubes V–1 and V–2 are in the same electrical state as before the first pulse. This positive pulse controls the next stage from state 0 to state 1. The third positive pulse applied to 32 of V–1 through 60 acts as the first pulse to cut-off V–1 and make V–2 conducting, with no signal being transmitted to the next stage. As seen, the next stage receives only one positive pulse out of two pulses applied to the first stage.

Figure 6:
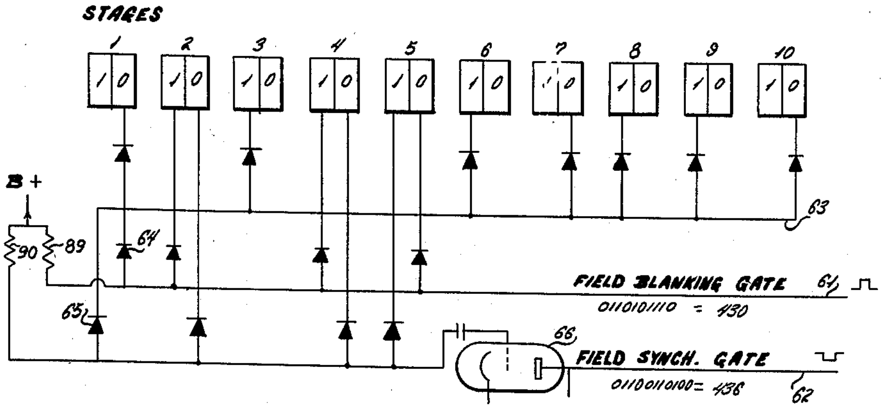
Figure 6 shows the details of the gate generator.

The details of gate generator 18 which provides gating signals in phase with the oscillation from oscillator 10 which corresponds to the leading edges of the field blanking and synchronization pulses are shown in Figures 6 and 7. A network of rectifiers is connected to the various stages of counter 16 as shown.

Figure 6 shows the diagram of the rectifier network and Figure 7 shows the detailed diagram in case of stages 1, 2 and 10 of the counter. The gate generator 18 is essentially an "and" gate and its output terminal 61 will have a positive pulse output each time all the diodes in that channel are cut-off and a negative pulse output through tube 66 at terminal 62 when all the rectifiers connected to said lead are cut-off.

For example in the particular equipment being described, the field blanking gate should occur at terminal 61 when a binary count of 430 binarily indicated as 0,110,101,110 is present in the counter, and the field synch. gate on lead 62 should appear at the count of 436 which is binarily indicated as 0,110,110,100.

As will appear both numbers have some digits in common, that is digits 1, 3, 6, 7, 8, 9 and 10. Therefore, it is possible to use the same rectifiers connected respectively to leads 61 and 62 through rectifiers 64 and 65. The digits which are different in the two numbers must be represented by different rectifiers. As shown, on Figure 7 when the corresponding digit is 0, the cathode of the rectifier is connected directly to the plate of the V–2 tube of the corresponding counting stage.

As was explained above the V–2 tube in each stage is conducting for one and cut-off for zero.

When the digit is 1, the cathode of the rectifier is connected at an intermediate tap P on load resistor 46 of the V–1 tube. If $R_1$ is the upper part resistor 46 and $R_2$ is the resistance of load resistor 50, point P is chosen such that $$R_1 i_0 = R_2 i_1$$

where $i_0$ and $i_1$ are respectively the currents which flow through V–1 and V–2 when the stage indicates respectively 0 and 1.

The anode of the rectifiers is connected to the anode supply $B^+$ respectively through resistors 89 and 90 and to leads 61 and 62.

When the tube to which is connected the rectifier is conducting, a current flows through the rectifier and the potential at the corresponding terminal is less than the $B^+$ potential. When the tube connected to the rectifier is cut-off, both electrodes of the rectifier are at same potential ($B^+$ potential) and the rectifier is cut-off. No current flows in the rectifier load resistor (89 or 90). When all the rectifiers connected to a given lead are cut-off, and only then, the potential of the lead is maximum (and equal to $B^+$). All the rectifiers connected to a given lead are simultaneously cut-off only during the half-line time duration which elapses between the given count and the one immediately following.

As will become apparent in the discussion of Figure 4, a negative gating signal is required from lead 62. This polarity inversion is readily obtained by the use of tube 66.

Referring now to Figure 7, a representative portion of the circuit diagram of the counter 16 is shown along with representative details as to how the gate generator 18 is connected to the various stages of the counter 16. Positive going pulses are obtained from wave shaper 12 and applied through condenser 60 of stage 1 to grid 32. The various stages of the binary counter 16 are then triggered in a conventional manner. When plate 48 of stage 10 goes positive, a positive going pulse is applied through condenser 60 and transformer 82 to grid 84 of triode 86. The plate is connected through transformer 82 to the $B^+$ terminal of the power supply and the cathode is connected through resistor 88 to ground. As the grid goes positive, a positive output is taken across resistor 88 and applied to the input of stages 1, 3, 4, 7 and 8 through condensers 58 as discussed above, which effectively subtracts a count of 205 to the standing count of 1024 in the counter, thereby enabling the counter to complete one cycle in a count of 819 pulses.

Figure 8:
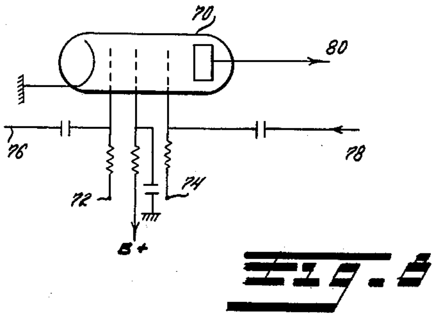
Figure 8 illustrates an embodiment of an electronic switch which can be used in the gating circuits.

Referring now to Figure 8, tube 70 illustrates a type of tube that can be used for gating stages 91, 92, 94, 96, 98 and 100 in Figure 4. The tube 70 is normally biased in the vicinity of cut-off by proper choice of the voltages applied at terminals 72 and 74 and to the screen grid and plate. The signal to be transmitted is fed to this tube through terminal 76 while the gating signal is applied to terminal 78. The output signal is present on lead 80.

*Description of the operation*

Referring now back to Figure 4 the pulses generated by oscillator 10 are at a frequency equal to twice the line frequency and are applied to delay line 14. Therefore the line blanking and synchronization signals must come from alternate pulses of oscillator 10. A 2:1 frequency divider 102 which may be an ordinary flip-flop or bistable multivibrator having a square wave output, is used to provide a gating signal to open gate 91 which controls the leading edge of the line blanking signals by triggering multivibrator 22 and is transmitted through the normally open gate 92 to control gate 98 to allow alternate pulses from tap A on delay line 14 to be passed on to multivibrator 21 and trigger it to one of its stable conditions and thereby provide the leading edges of the line synchronization signal. Since the leading edge of the line blanking signal occurs before the leading edge of the line synchronization signal, tap D on the delay line is closer to the oscillator 10 than is tap A. The distance between taps D and A is made adjustable and to provide the 0.5 microsecond spacing shown between points D and A in Figure 2 when portable camera installations are used.

The exact timing of the rear of the line synchronization signal is provided by the signal at tap B on delay line 14 and is fed through normally open gate 94 which is operative to trigger multivibrator 21 to its other stable condition. Only alternate pulses collected at tap B which are produced immediately after triggering of multivibrator 21 are operative to trigger it back to its rest operation. The rear of the line blanking pulse is accurately controlled by the signal from tap E which moves with tap D on delay line 14 so that the length of the line blanking signal remains constant, and is fed through diode 104 and network 106 to trigger multivibrator 22 back to its other stable condition.

The leading edge of the field blanking signal is obtained through gate 96 which is opened by a positive pulse on lead 61 from gate generator 18. Since the field blanking signal begins simultaneously with the line blanking signal, as shown in Figure 3, a pulse is taken from terminal D on delay line 14 and fed through gate 96 to trigger multivibrator 23. A negative gating pulse is supplied by gate generator 18 through lead 62 to close both gates 92 and 94 at the time of occurrence of the leading edge of the field synchronization pulse. As shown on the curves of Figure 3, this edge is alternatively in phase with the leading edge of the line synchronization pulses and ½ line out of phase. Closing of gate 92 opens gate 98 which transmits the next pulse to be collected at tap A to trigger multivibrator 21. Since gate 94 is closed for ½ line time interval, multivibrator is not triggered back to its former state until it receives the next pulse collected at tap C and transmitted through network 108. When gate 94 is open, pulse from tap C has no effect since multivibrator 21 is back to its initial state when it occurs. Actually each pulse is collected at tap C before being collected at tap A. Therefore it is only the next pulse which triggers back multivibrator 21 to it first state. Tap C is chosen such that half the line duration minus the delay between taps C and A is equal to the field sync. duration of 20 $\mu$s.

In the odd fields, as shown in the lower half of Figure 3, the beginning of the field synchronization pulse occurs with the timing of an alternate pulse from tap A on delay line 14 which is ordinarily blanked out by the 2:1 divider 102 through gates 92 and 98. However gate 92 operates to provide a positive impulse output on lead 114 to open gate 98 any time there is a negative pulse applied to either of its inputs. Ordinarily the negative pulse output from frequency divider 102 is operative to cut gate

92 off and provide a positive pulse through lead 114 which opens gate 98 and permits the pulse from tap A to be passed to multivibrator 24. However during the occurrence of the beginning of the field synchronization pulse when there is a position pulse applied to the input of gate 92 through lead 116 which would ordinarily cause gate 92 to conduct and supply a negative pulse to the input of gate 98 and thereby close gate 98, the negative pulse from lead 62 applied to the other input of gate 92 keeps the tube in gate 92 cut-off thereby supplying a positive gating signal to the input of gate 98 and allows the signal from tap A to be applied to multivibrator 21. This same negative pulse in lead 62 closes gate 94 thereby preventing the pulse output from tap B of delay line 14 from returning multivibrator 21 to its other stable condition, thus permitting the output from tap C of delay line 14 to provide the rear edge of the field synchronization signal.

Since the front edge of the field blanking gate is provided by the gate generator 18 in response to a count of 430 and the length of the field blanking signal is 41 lines or 82 counts, the rear edge of the field blanking pulse occurs at the count of 512 and can be taken from the output of the last counting stage which undergoes the same change every time the counter registers a count of 1024 through a wave shaping network 120. This positive pulse is applied to gate 100 which then triggers multivibrator 23 back to its second stable condition upon the reception of the next pulse from terminal D of delay line 14.

Figure 9 shows the vertical sync. signals which are to be transmitted according to Euporean (C.C.I.R.) standards. The horizontal or line sync. and blanking pulses are of the same shape as shown on Figure 2. As shown, the following signals are provided during the vertical blanking:

(*a*) Five short equalizing pulses at twice the line frequency and shorter than line synch, pulses I.

(*b*) Five long sync. pulses at twice the line frequency longer than the line sync. pulses II.

(*c*) Five short equalizing pulses such as (*a*) III.

All these sync. pulses are in phase with a master oscillation at twice the line frequency and they are displaced in phase of ½ line interval between two successive fields.

The line frequency is 525×30=15,750 c.p.s. and the field frequency 60 or 625×25=15,625 and the field frequency=50 cycles.

Referring now to Figure 10, a modification of this invention is shown which is adapted to provide the synchronization signals shown on Figure 9. Master oscillator 210 is operated at 31,500 cs. and feeds a wave shaping network 212 providing pulses at twice the line frequency both to delay line 214 and counter 216. Counter 216 is set up slightly different in that it has two parts, the first comprising three binary stages which are interconnected to complete a cycle once every 5 counts and the second comprising seven binary stages predetermined to complete a cycle every 105 counts. The purpose of the first section is to provide one pulse into the second section of the counter for every five pulses from the oscillator so as to deliver gating signals the duration of which is equal to five half lines for providing a series of five equalizing pulses immediately before and after five field pulses. Curves of Figure 11 will help understanding of the operation of the generator, very similar to that of Figure 4.

The line blanking signal is obtained by use of the same circuit components that were used in connection with Figure 4 for obtaining the same signal and will not be again described in detail.

The double line frequency pulses out of wave shaping network 212 (curve O) are supplied to a binary frequency divider such as a flip-flop or bistable multivibrator 224 the output signal of which is shown by curve 224. Signal 224 is supplied to control gate 218 through open gate 220. Pulses on tap A (curve A) are transmitted through gate 218 when signal 224 is positive. The output from gate 218 is shown on curve 218. It triggers multivibrator 230 into a second state of operation. The rear of line sync. pulses corresponds to alternate pulses at tap B on line 214 which are transmitted through open gate 226 to trigger bistable multivibrator 230 back to its first state of operation. The leading fronts of both equalizing and vertical sync. pulses are in phase with pulses on tap A. During the equalizing pulses a positive gate is delivered by gate generator 236 through lead 238 (see curve 238) to gate 244 which cuts-off both gate 220 and gate 226 and opens gate 228. Thereby multivibrator 230 is triggered on by the next pulse at tap A which follows gate 238 and triggered off by the same pulse collected on tap F. As seen, the delay between A and F is shorter than between A and B. Curve F shows the signal picked off at tap F.

The leading and rear edges of the field blanking pulse are obtained at tap D movable along line 214 since they are in phase with the leading edges of the line blanking pulses. The equalizing gate is applied to gate 234 through lead 238 to allow the next pulse from tap D of delay line 214 to pass through gate 234 to trigger bi-stable multivibrator 240 to provide the leading edge of the field blanking pulse.

Simultaneously with the beginning of the field blanking pulse equalizing pulses are present at twice the line frequency and replace the line synchonization pulses. In order to make sure that each pulse from oscillator 210 is operative to trigger bi-stable multivibrator 230 instead of alternate pulses as are required for the line synchronization signal, gate 220 is cut off continuously during the equalizing pulse interval by a negative pulse through lead 242. A negative pulse to the input of gate 220 from either lead 242 or 222 causes the tube in gate 220 to cut off and supply a positive pulse output to be applied to the input of gate 218 thereby leaving it open.

Conductor 238 from gate generator 236 which has the positive gating signal used for the leading edge of the field blanking signal and has a length equivalent to five pulses from oscillator 210 or five counts from the 5:1 section of the counter is connected to gate 244 and provides the necessary negative gating signal that is required on line 242. The positive gating signal on line 238 is also applied to gate 228 to permit the rears of the equalizing pulses to be determined by the signals from terminal F of delay line 214.

At the end of the gating signal on line 238 representing the time of occurrence of the equalizing pulses, a second gating signal is present on line 246 which exists during the time the field synchronization pulses are transmitted. This gating signal is applied to gate 226 and is effective to close that gate so that with gate 228 being normally closed, the rears of the field synchronization pulses are provided by pulses from tap C on delay line 214 through network 232. This gating pulse is also applied to gate 244 which in turn controls gate 220 to turn on gate 218 so that the double line frequency pulses from oscillator 210 are applied through terminal A of delay line 214 through gate 218 to multivibrator 230. At the end of the gating pulse on line 246 representing the time of occurrence of the field synchronization a second positive gating signal is present in line 238 which is effective to produce a second set of equalizing pulses. When the second pulse on line 238 is terminated, line synchronization signals are again provided for the next field.

A last gating signal is provided from gate generator 236 on line 248 at the end of a field blanking period and is applied to gate 250 so that the next pulse from terminal D on delay line 214 will be operative through gate 250 to trigger multivibrator 240 back to its other stable condition. As the end of the field blanking signal occurs at a count that is not a multiple of five, the gate generator 236 is connected to the various stages in the 5:1 counter as well as the 105:1 counter so that the timing signal is obtained at the exact desired time.

Gate generator 236 is of the same general type as shown in Figure 6 so the particular count the generator is responsive to for providing gating pulses is necessarily different than those shown in Figure 6 because of the different number of lines and fields used per second. Reference is made to the February 1949 issue of the proceedings of the Institute of Radio Engineers, pages 139 to 147 for further explanation of this type of gating circuit.

While both embodiments of this invention that have been described include a binary chain counting circuit, ring type counting circuits using binary stages connected to be based on a counting notation of 3, 4, 5, 10 or any other number could be used without departing from the principles of this invention, as it is only necessary that the gating circuit be connected to different stages of the counter so that each gating signal from the gating circuit is available once during each complete cycle of the counter. However, the use of a binary counter as shown permits the use of a minimum number of tubes in the gate generator thereby reducing original costs, overall maintenance and power requirements while providing high stability in operation and complete freedom from drift due to tube ageing.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein:

What is claimed and desired to be secured by United States Letter Patent is:

1. Apparatus for developing two different signals each occurring at separate accurately timed intervals comprising means for developing uniformly recurring control signals, a counting circuit having a plurality of stages interconnected to provide an output frequency equal to the frequency of the one of said two different signals having the lowest frequency, a delay circuit, means for connecting both said counting circuit and said delay line to receive said recurring control signals, "and" gate means comprising an array of diodes having a plurality of input terminals arranged to serve as first and second "and" gates; means connecting the input terminals of said array of diodes to counting tubes in said counter so that when the counter manifests the counts to which the respective "and" gates are responsive separate gating signals will be developed, output terminals from said delay circuit adapted to provide groups of signals delayed with respect to said control signals, coincidence circuit means, and means connecting said first and second gating signals and delayed signals from said delay circuit output terminals to said coincidence circuit means.

2. In a television signal generator developing line and field blanking pulses, a master oscillator, a counting circuit composed of a plurality of stages, means feeding the control signals from said master oscillator to said counting circuit, means interconnecting the output from one stage of said counting circuit to the inputs of predetermined stages so that said counting circuit completes one cycle in the time period required for each field, an "and" gating circuit comprising an array of diodes having a plurality of separate input terminals and an output terminal, means connecting each of said input terminals to voltage points in different counting stages that have similar voltage levels only when a predetermined count is present in said counter whereby a gating signal is generated once during the period of each field, a delay circuit having fixed contacts and movable contacts, means feeding control signals from said master oscillator to said delay circuit, means combining the output signal from said "and" gate having a recurrence rate equal to the field frequency and an output signal from one of said movable contacts on said delay circuit to produce one edge of the field blanking pulse, circuit means responsive to a second predetermined count in the counter for providing a second signal having a recurring rate equal to the field frequency but displaced from said first signal by an interval approximately equal to the length of said field blanking pulse and means to combine said second signal and another output signal from said delay circuit to produce the other edge of said field blanking pulse.

3. In a television signal synchronization generator, a master oscillator for providing a recurring signal at a first frequency, a counting circuit having a plurality of stages, means for connecting an output from one of the stages to the inputs of a plurality of stages so that said counter circuit will complete one cycle of operation during a predetermined time interval in accordance with said first frequency, a delay circuit, means feeding the output from said master oscillator to both said binary counting circuit and said delay circuit, "and" gate means including a first gate generator and a second gate generator, said first gate generator comprising a crystal diode array having a plurality of input terminals, means connecting said input terminals to predetermined stages in said counter chain so that said gate generator is operative to provide an output pulse in response to a first predetermined count, a first bi-stable circuit, terminal means on said delay circuit to provide delayed recurring signals, a coincidence circuit, means connecting the output of said coincidence circuit to said first bi-stable circuit, means connecting said output pulse from said gate generator and said delayed recurring signals from said delay circuit to said coincidence circuit whereby said bi-stable circuit is triggered to a first stable condition in response to concurrently occurring signals from said delay circuit and said gate generator, further means including a gate circuit connected between said bi-stable circuit and said delay circuit to provide a signal operative to trigger said bi-stable circuit to said second stable condition only if said gate circuit is open, said second gate generator comprising a diode array having a plurality of input terminals, means connecting the input terminals of said second gate generator to a plurality of predetermined stages in said counter chain to be operative to produce an output signal in response to a second predetermined counter from said counter circuit, a second bi-stable circuit, a second gate circuit connected to the output of said second gate generator, means connecting said second gate circuit between said second bi-stable circuit and said delay circuit whereby the second bi-stable circuit is triggered to a first stable condition in response to an output from said delay circuit when said second gate circuit is open, a third gate circuit connected to be responsive to a third predetermined count from the binary counter chain, means connecting said third gate circuit between said second bi-stable circuit and said delay circuit whereby said second bi-stable circuit is triggered to its other stable condition in response to concurrently occurring output signals from said delay circuit and said third predetermined count from the binary counter chain.

4. In a television signal generator developing line and field synchronizing signals, means developing control signals at a first frequency higher than the line frequency, said means comprising an oscillator, a wave shaper and a frequency divider, an electronic counter composed of a plurality of stages, means feeding said control signals of said first frequency to said counter, means interconnecting the output from one stage of said counter to the inputs of predetermined stages of said counter so that one complete cycle of said counter will occur at the field frequency, an "and" gating circuit comprising an array of crystal diodes having a plurality of separate input terminals and an output terminal means connecting each of said input terminals to voltage points in different counting stages that have similar voltage levels only when a predetermined count is present in said counter, whereby a gating signal is generated once during the period of each field, the time of occurrence of said gating signal being determined by the connection of said input terminals in said counting circuit, a delay circuit, means feeding said control signals to said delay circuit, first, second and third output terminals from said delay circuit, means controlling the leading edge of both the line and field synchronization signals from said first delay circuit output terminal, a second gate circuit, means controlling the rears of said line synchronization signals from said second output terminal through said second gate circuit, means controlling the rears of said field synchronization pulses from said third output terminal, and means applying the gating signal from said "and" gating circuit to said second gate circuit to prevent the output from said second terminal from controlling the rear of a synchronization pulse to thereby permit the output from said third terminal to control the rear of said synchronization signal and increase the length of the synchronization signal to provide a field synchronization pulse.

5. In combination with a source of recurring pulses, an electronic counter connected to be operative in response to said pulses, said counter comprising two sections in cascade, means connecting the output of each section to the inputs of predetermined stages in its own section only so that each section will complete one cycle of operation in response to a predetermined number of pulses, an "and" gate having a plurality of inputs, means connecting said inputs to selected counting stages in said second section, whereby a first gating signal is provided at the count indicated by said second section and for a duration determined by one length of the cycle of operation of said first section, means providing a second gating signal from said counter in response to a predetermined count from both sections of said counter, a delay line, means connecting the delay line to said source of pulses, a plurality of output taps spaced along said delay line, a coincidence circuit having one input from one of the taps on said delay line and another input from said "and" gate to provide a group of signals delayed with respect to said pulses from said source and only during the interval of said gating period.

References Cited in the file of this patent

UNITED STATES PATENTS

| | | |
|---|---|---|
| 2,584,363 | Mumma | Feb. 5, 1952 |
| 2,584,811 | Phelps | Feb. 5, 1952 |
| 2,589,254 | Hoeppner | Mar. 18, 1952 |
| 2,644,887 | Wolfe | July 7, 1953 |
| 2,674,727 | Spielberg | Apr. 6, 1954 |
| 2,766,379 | Pugsley | Oct. 9, 1956 |

FOREIGN PATENTS

| | | |
|---|---|---|
| 596,670 | Great Britain | Jan. 8, 1948 |